Aug. 10, 1954
G. L. CORY
2,686,142
METHOD OF MANUFACTURING CORRUGATED MICROPOROUS
SEPARATORS OF HARD RUBBER COMPOSITION MATERIAL
Filed May 1, 1951
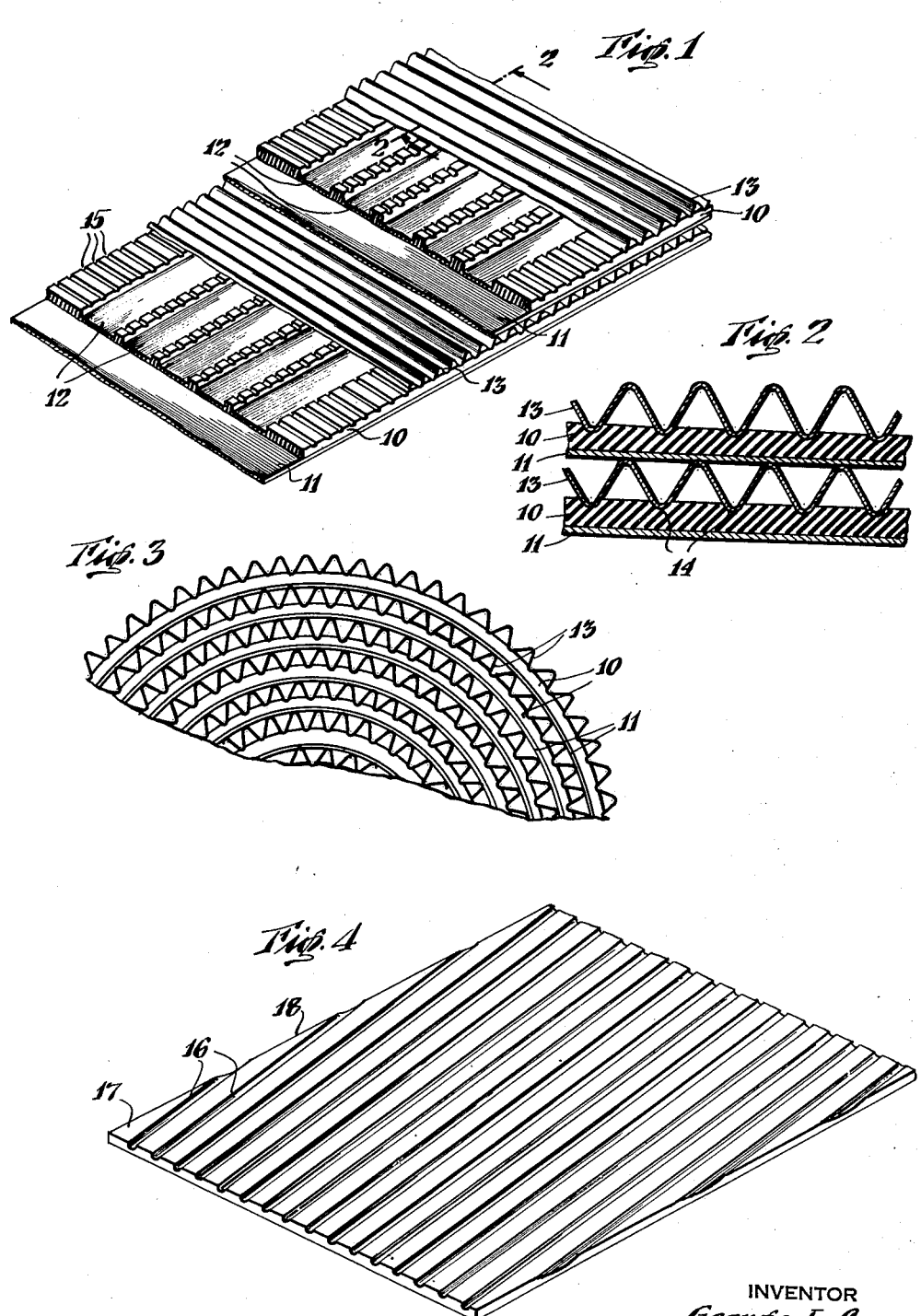
INVENTOR
George L. Cory
BY
Robert S. Dunham
ATTORNEY Patented Aug. 10, 1954

2,686,142

UNITED STATES PATENT OFFICE 2,686,142

METHOD OF MANUFACTURING CORRUGATED MICROPOROUS SEPARATORS OF HARD RUBBER COMPOSITION MATERIAL

George L. Cory, Erskine Lakes, N. J., assignor to American Hard Rubber Company, New York, N. Y., a corporation of New York Application May 1, 1951, Serial No. 223,853

5 Claims. (Cl. 154—106)

The present invention relates to a method of manufacturing corrugated microporous separators of hard rubber composition material. More particularly, the invention relates to a method of manufacturing such separators and especially for forming corrugations therein in a desired or predetermined direction by a means other than calender rolls in or by which a sheet or strip of the separator material may be formed.

Microporous separators made from hard rubber composition material have been in use for some time in electrolytic cells such, for example, as wet storage batteries, wherein the separators are immersed in the electrolyte, such as a solution of sulphuric acid. In some storage batteries and in other electrolytic cells it may be desired to have a reasonably free circulation of the electrolyte, both vertically and transversely in respect to the separators, while having the separators positioned closely adjacent to some other plate-like member in the cell, such as one of the electrodes. In order to permit of a desired circulation of the electrolyte transversely and/or vertically in respect to the separators along one or both faces thereof, it may be desired to form corrugations therein. Longitudinal corrugations for this purpose have been formed in the past by passing the uncured hard rubber material between calender rolls, at least one of which is provided with ribs and grooves, so as to make the complementary shape for that surface of the separator. During subsequent vulcanization, these ribs and grooves must somehow be protected from being flattened out or otherwise deformed in the event that the separator material is placed in a stack or wound tightly in a roll. The prior art has also provided means for preventing such undesired deformation of the ribs and grooves formed by the calendering process as aforesaid during such vulcanization. Such means, however, are cumbersome at best and generally undesirable in commercial use.

The general forming of separators of the kind to which the present invention pertains is disclosed in the patent to Schelhammer et al., No. 2,274,260, issued February 24, 1942. This patent, however, while disclosing the forming of a strip of separator material, which can be cut into separators, did not disclose the forming of corrugated separators or of forming corrugations therein. It did disclose calender rolls shown in Fig. 1 of the patent at 15 and 16, by which one surface of the separators could be corrugated as aforesaid, for example, by providing the calender roll 15 of the patent with a plurality of annular ribs and intervening grooves. This patent also discloses the composition of material of which separators of the type to which the present invention pertains may be formed; and further discloses the use of a backing material of an unstretchable character, such as kraft paper, for preventing undesired distortion of the separator strips during the subsequent vulcanization and drying.

The present invention provides a method similar in many respects to that disclosed in the Schelhammer et al. patent aforesaid, by which grooves, or additional grooves or corrugations, may be formed in separator sheets or strips by arranging between each layer of such separator sheets or strips, whether they be piled in a stack or rolled on a reel, a layer of a corrugated material; then applying sufficient pressure onto the stack or roll in a direction substantially perpendicular to the surfaces of the separator sheets or strips, to cause the corrugated material layers to press into and deform the uncured hard rubber composition material to form the desired corrugations or grooves therein. This stack of alternate layers of separator forming material and corrugated material, or the roll thereof, may then be placed in a conventional vulcanizer and the vulcanization of the hard rubber composition proceed in a conventional manner. During this vulcanizing, which is preferably wet vulcanizing, the corrugated material of the alternate layers acts not only to form and maintain the desired corrugated shape for the finished product, but also acts as spacers, permitting the access of fluids such as hot water or steam to the hard rubber composition throughout the vulcanizing operation, and subsequently during the drying thereof permits the access of heated gases to effect the drying. The corrugated material layers have, therefore, a double function: (a) they form and maintain the desired shape of the corrugations, and (b) they serve as spacers permitting free access of fluids to the hard rubber composition during vulcanizing and drying.

The corrugations imposed upon the separator material by the intervening layers of corrugated material, in accordance with the method of the present invention, are relatively permanent as compared with corrugations which could be formed in the separators subsequent to their vulcanization, by pressure plus heat or otherwise. The corrugations formed in accordance with the present method may be the only corrugations in the finished separators and may be in any predetermined direction in respect to the finished separators, including not only directions parallel to one side or another, but also directions at an acute angle to one side or another. For instance, the corrugations may be disposed at an angle of 10° in respect to the longitudinal axis of the separator strip prior to cutting it up into individual separators.

Furthermore, corrugations formed in accordance with the present invention may be superimposed upon corrugations or ribs and grooves formed by calendering as aforesaid. Under such circumstances, the direction of the parallel corrugations or grooves formed by the method of the present invention will be in a direction at a substantial angle, for instance, a right angle to the corrugations formed by calendering. Thus, the calendered corrugations may be lengthwise of a strip of separators prior to cutting them up, while the corrugations formed in accordance with the present method may be transverse thereof.

The depth of the corrugations formed in accordance with the present invention may be predetermined within reasonable limits by controlling the pressure transverse of the stack or substantially radial of a roll of the separator material as it is prepared for vulcanizing as aforesaid. The interval between corrugations is, of course, determined by the character of the corrugated material used in forming the corrugations in accordance with the present method. Specific instances of these variations will be given by way of example hereinafter.

The present invention will be set forth particularly in the description of certain embodiments thereof in the following specification and will be pointed out in the appended claims, all when considered in connection with the accompanying drawings, in which:

Figure 1 is a view in perspective, with some of the layers broken away, illustrating the formation of a stack of alternate separators and layers of corrugated material, which may be built up in accordance with the method of the present invention, parts of only two separators and their associated corrugated material layers being illustrated for clearness;

Fig. 2 is a fragmentary transverse sectional view taken substantially on the line 2—2 of Fig. 1;

Fig. 3 is a fragmentary view substantially in end elevation of a roll built up in accordance with the teachings of the Schelhammer et al. patent, but embodying in addition, the method of the present invention; and Fig. 4 is a view in perspective of a single separator, which could also be a part of a long separator strip, showing grooves which may be formed therein by the method of the present invention at an acute angle to the sides of the strip.

In accordance with the present invention, the uncured hard rubber composition which may, for example, be of the same composition as that disclosed in the Schelhammer et al. patent aforesaid, is compounded in a conventional manner, for example, as disclosed in that patent, and then formed by any suitable means, again, for example, as disclosed in that patent into the form of sheets or elongate strips. If desired, the sheets or strips may be backed on one side as disclosed and claimed in the Schelhammer et al. patent aforesaid, by sheets or strips of a substantially unstretchable material, such as kraft paper, for the purposes set forth in that patent. Furthermore, if desired, a strip or a sheet of hard rubber composition material as shown in the drawings, Figs. 1 and 2, at 10 and which is backed by unstretchable material, such as kraft paper, as shown at 11, may be provided with corrugations by the use of a calender roll, such as the roll 15 of the Schelhammer et al. patent. Such corrugations, in the event that the calender roll is formed with annular ribs and grooves, will extend lengthwise of the strip or sheet 10 as shown, for example, at 12. In the event it is desired to provide transverse grooves or corrugations in the finished separators, the sheets may be assembled into a stack by interleaving between layers of the sheets 10, alternate layers of corrugated material 13. When a sufficient thickness of alternate layers of the hard rubber composition 10 and corrugated material 13 are built up to form an assembly of the desired thickness, sufficient pressure is imposed upon the assembly in a direction perpendicular to the surfaces of the sheets 10 (for example vertically and parallel to the plane of the drawing, Fig. 2), so as to force the corrugated material into the uncured and deformable hard rubber composition material as indicated, for example, at 14, Fig. 2. This forms grooves as indicated at 15, Fig. 1. As will now be obvious, the depth of these grooves will be a function of the deformability of the material 10 while in its unvulcanized state and also of the amount of pressure imposed upon the stack as a whole. The spacing between the grooves will be a function of the number of corrugations in the material 13 per unit of overall length thereof in a direction transverse to the corrugations. The shape of the grooves formed is a function of the shape of the corrugations of the material 13, which is selected in view of the groove shape desired.

In a similar way and by supplying a corrugated material such as 13 in strip form and supplying such a strip next to the strip of the uncured hard rubber composition, the two strips may be rolled up together upon a reel as shown at 36 in the patent to Schelhammer et al., and as shown for example in Fig. 3 of the present drawings. In this figure the hard rubber composition material is again shown at 10, the backing material, as kraft paper, at 11, and the corrugated material at 13. The only difference here is that the pressure used to form the grooves is brought to bear to force the corrugated material into the hard rubber composition, so as to form grooves therein, by controlling the tension of the strips during the winding of the two materials together upon the reel. This tension control is effective to exert substantially radial pressure in a way which will now be obvious to those skilled in the art, so as to effect the same result as in the form disclosed in Figs. 1 and 2.

The corrugated material used in accordance with the present invention, may be any material which will maintain its shape under conditions encountered in subsequent vulcanizing. Such material may, for example, be a relatively thin sheet metal, such as sheet aluminum. Due to the fact that the vulcanizing is preferably effected wet and as the corrugated material remains in position during the vulcanizing and also during subsequent drying, which is normally done by the use of heated air, it is usually desirable not to employ a material which will be corroded incident to its use. For this reason, corrugated iron or steel sheets, other than stainless steel, are normally not desired for use, as these materials are subject to corrosion. On the other hand, the character of the material 13 other than its strength and ability to stand up under the conditions of use as aforesaid, is immaterial to the present invention. Some non-metallic materials may be effective under certain conditions and are to be considered as within the purview of the present invention.

The vulcanizing of a stack or roll of material assembled as aforesaid in accordance with the present invention, may per se be conventional and may, for example, follow the teachings of the Schelhammer et al. patent aforesaid, following which drying is effected in any desired manner, for example, by the use of circulating heated air.

The corrugated material 13 according to the present invention serves not only to form the grooves 15 in the separators as aforesaid, but also serves during the vulcanizing and drying to permit free and substantially uninterrupted access of the fluids used, for example, hot water or steam during the vulcanizing, and heated air during the drying, to the hard rubber material 10 being vulcanized and dried. Thus, the corrugated material 13 has a dual function as aforesaid.

While the embodiments of the invention disclosed in the drawings herewith and in the Schelhammer et al. patent employ a sheet of an unstretchable material, such as kraft paper, in adhesive contact with one side of the strip of sheet of hard rubber composition material, this use may be omitted with some possible liability of damage by deformation of the hard rubber material during vulcanizing and drying. However, the use of the intervening layers of corrugated material in accordance with the present invention may be effective to prevent such undesired deformation in lieu of the use of the unstretchable material layers shown at 11. These layers 11 may thus sometimes be omitted when following the teachings of the present invention. Such a variant of the specific teaching hereinabove is also to be considered within the purview of the present invention.

It is also contemplated in accordance with the present invention, and as illustrated, for example, in Fig. 3, that only a single set of grooves, may be formed in the separators by the corrugated material, in accordance with the present invention. Such grooves, may, for example, be on one surface only, as shown at 16 in Fig. 4 for the rubber composition material separators 17. Furthermore, these grooves may be in any predetermined direction, for example, as shown in Fig. 4 as an angle of about 10° in respect to the direction of one side as 18 of the separator 17 or of a strip thereof as shown in the Schelhammer et al. patent.

When making very thin separators, for example, in accordance with the teachings of my copending application, Serial No. 221,027, filed April 14, 1951, now Patent No. 2,637,876, for Method of Preventing the Occurrence of Pin Holes in Thin, Microporous Hard Rubber Separators, there may be used a sheet of unstretchable material, such as that shown at 11 in Figs. 1 and 2 on both sides of the sheet or strip of hard rubber composition material. Under such circumstances and with sufficient pressure effective, a corrugated or wavy form in transverse section may be produced in the entire separator, which will be permanent in nature. This may be done by placing the corrugated strips or sheets 13 in position, for example, as shown in Fig. 2 wherein the corrugations may be arranged substantially as a showing of two alternating currents in phase with one another.

The following examples may be given of the actual use of the method of the present invention, the composition of the hard rubber material in each case being substantially that set forth in the Schelhammer et al. patent aforesaid:

(1) A corrugated aluminum sheet having a pitch measured from one corrugation to the next of about $\frac{1}{4}''$ and a depth of the corrugations of about $\frac{3}{32}''$ was used to provide grooves in a rubber separator which were about $\frac{1}{64}''$ in depth (2) A corrugated sheet of similar material having a pitch between corrugations of $\frac{3}{32}''$ and a depth of corrugations of $\frac{1}{16}''$ also served to provide grooves in the separator about $\frac{1}{64}''$ in depth.

(3) A corrugated sheet of the same material having a pitch between corrugations of about $\frac{1}{16}''$ and depth of corrugations of about $\frac{3}{32}''$ was used to provide grooves in separators of about $\frac{1}{16}''$ in depth.

(4) When making very thin hard rubber separators in accordance with the teaching of my copending application, Serial No. 221,027, aforesaid, corrugated material having a wavy form was used to impart a permanent continuous wave to the final separator, so that opposite sides thereof had complementary ribs and grooves, the cross-section of the separator having a shape approximating that of a sine wave.

All possible variations and advantages of the use of the method, which will occur to those skilled in the art from the foregoing description and from the equivalents herein particularly taught are to be considered within the purview of the present invention. I do not wish to be limited, therefore, except by the scope of the appended claims, which are to be construed validly as broadly as the state of the prior art permits.

What is claimed is:

1. The method of manufacturing corrugated microporous separators for use in electrolytic cells, comprising the steps of preparing sheets of uncured hard rubber composition of a type suitable for making such separators and which is deformable under pressure, interleaving between layers of said sheets alternate layers of corrugated sheet metal which is proof against rapid corrosion, which has corrugations of a depth substantially greater than the corrugations to be formed thereby in the microporous separators and which will maintain its shape under conditions encountered in subsequent vulcanizing, to form an assembly comprising alternate layers of said rubber composition and of said corrugated sheet metal, applying sufficient pressure to said assembly in a direction perpendicular to said alternate layers to cause a deformation of the layers of rubber composition by the corrugations of said corrugated sheet metal but insufficient pressure to cause said rubber composition to conform completely to the shape of the corrugations of said sheet metal, so as to leave voids at each corrugation between the corrugated material and the rubber composition material, wet vulcanizing the hard rubber composition of said assembly to form microporous separators, and thereafter removing said corrugated sheet metal from between said separators.

2. The method of manufacturing corrugated microporous separators for use in electrolytic cells, comprising the steps of preparing sheets of uncured hard rubber composition of a type suitable for making such separators and which is deformable under pressure, adhesively applying sheets of paper to at least one face of said sheets of uncured hard rubber composition to form composite sheets, interleaving between layers of said composite sheets alternate layers of corrugated sheet metal which is proof against rapid corrosion, which has corrugations of a depth substantially greater than the corrugations to be formed thereby in the microporous separators and which will maintain its shape under conditions encountered in subsequent vulcanizing, to form an assembly comprising alternate layers of said composite sheets and of said corrugated sheet metal, applying sufficient pressure to said assembly in a direction perpendicular to said alternate layers to cause a deformation of the sheets of rubber composition by the corrugation of said corrugated sheet metal but insufficient pressure to cause said rubber composition to conform completely to the shape of the corrugations of said sheet metal, so as to leave voids at each corrugation between the corrugated material and the rubber composition material, wet vulcanizing the hard rubber composition of said assembly to form microporous separators, thereafter removing said corrugated sheet metal from between said composite sheets, and stripping off said paper from said separators.

3. The method of manufacturing microporous separators for use in electrolytic cells, comprising the steps of preparing sheets of uncured hard rubber composition of a type suitable for making such separators and which is deformable under pressure by passing such a composition through calender rolls, at least one of which is shaped to form said composition into sheets having corrugations running in a predetermined direction on at least one face thereof, interleaving between layers of said sheets alternate layers of corrugated sheet metal which is proof against rapid corrosion, which has corrugations of a depth substantially greater than the corrugations to be formed thereby in the microporous separators and which will maintain its shape under conditions encountered in subsequent vulcanizing and which is so disposed and corrugated that the corrugations run in a second direction at a substantial angle to the first named direction, to form an assembly of alternate layers of said composition and said corrugated sheet metal, applying sufficient pressure to said assembly in a direction perpendicular to said alternate layers to cause a deformation of the layers of said composition by the corrugations of said corrugated sheet metal but insufficient pressure to cause said rubber composition to conform completely to the shape of the corrugations of said sheet metal, so as to leave voids at each corrugation between the corrugated material and the rubber composition material, wet vulcanizing the hard rubber composition of said assembly to form microporous separators, and thereafter removing said corrugated sheet metal from between said separators.

4. The method of manufacturing corrugated microporous separators for use in electrolytic cells, comprising the steps of preparing an elongate strip of uncured hard rubber composition of a type suitable for making such separators and which is deformable under pressure, supplying next to said strip a strip of a corrugated sheet metal which is proof against rapid corrosion, which has corrugations of a depth substantially greater than the corrugations to be formed thereby in the microporous separators and which will maintain its corrugated shape under conditions encountered in subsequent vulcanizing, winding said strips together on a reel to form a roll of said strips, with each turn of said strip of rubber composition spaced from the next adjacent turn of such composition by an intermediate turn of said corrugated sheet metal, controlling the tension of said strips during the winding thereof on said reel so as to exert a pressure effective on the several turns of said roll in a direction substantially axial thereof sufficient to cause a deformation of the rubber composition by the corrugations of said strip of corrugated sheet metal but insufficient pressure to cause said rubber composition to conform completely to the shape of the corrugations of said sheet metal, so as to leave voids at each corrugation between the corrugated material and the rubber composition material, wet vulcanizing the rubber composition while it is in said roll as aforesaid, and thereafter removing said corrugated sheet metal from said strip of rubber composition and cutting the latter into pieces of a size for use as separators.

5. The method according to claim 4, wherein the step of preparing said strip of uncured hard rubber composition includes assembling in adhesive contact with one face thereof a strip having substantially the same surface area and formed of paper for preventing undesired shrinking and deformation of the hard rubber composition strip during subsequent vulcanizing, and the calendering together of these hard rubber composition and paper strips between calender rolls, one of which is formed to provide parallel ribs and grooves in the hard rubber composition strip in a predetermined direction; and wherein the strip of corrugated sheet metal has its corrugations arranged at a substantial angle to said predetermined direction, so that the separators as finally formed have a plurality of intersecting grooves formed therein.

References Cited in the file of this patent

UNITED STATES PATENTS

| Number | Name | Date |
| --- | --- | --- |
| 986,162 | Gare | Mar. 7, 1911 |
| 1,237,554 | Price | Aug. 21, 1917 |
| 2,274,260 | Schelhammer et al. | Feb. 24, 1942 |
| 2,336,754 | Schelhammer et al. | Dec. 14, 1943 |
| 2,422,998 | Adams et al. | June 24, 1947 |
| 2,446,771 | Knowland | Aug. 10, 1948 |